United States Patent
Patac (10) Patent No.: US 9,192,149 B2
(45) Date of Patent: Nov. 24, 2015

(54) FISH FEEDING DEVICE

(71) Applicant: Douglas Scott Patac, Bennington, VT (US)

(72) Inventor: Douglas Scott Patac, Bennington, VT (US)

( * ) Notice: Subject to any disclaimer, the term of this patent is extended or adjusted under 35 U.S.C. 154(b) by 198 days.

(21) Appl. No.: 13/986,812

(22) Filed: Jun. 10, 2013

(65) Prior Publication Data

US 2014/0360433 A1 Dec. 11, 2014

(51) Int. Cl.
*A01K 61/02* (2006.01)

(52) U.S. Cl.
CPC .................................... *A01K 61/025* (2013.01)

(58) Field of Classification Search
CPC .................................................. A01K 61/025
USPC ............. 119/51.04, 174, 245, 247; 47/41.13; 248/693, 107, 302, 303
See application file for complete search history.

(56) References Cited

U.S. PATENT DOCUMENTS

| | | | | | |
|---|---|---|---|---|---|
| 3,636,670 | A | * | 1/1972 | Frye | 52/157 |
| 4,094,096 | A | * | 6/1978 | Huyssen | 47/41.13 |
| D267,504 | S | * | 1/1983 | Hamlin | D22/147 |
| 5,088,666 | A | * | 2/1992 | Lang | 248/87 |
| D363,616 | S | * | 10/1995 | Allen | D6/417 |
| 5,630,293 | A | * | 5/1997 | Hicks, Sr. | 47/70 |
| 6,349,501 | B1 | * | 2/2002 | Freeman | 47/41.01 |
| D487,862 | S | * | 3/2004 | Tincher | D7/620 |
| D628,464 | S | * | 12/2010 | Oskey | D8/356 |

* cited by examiner

*Primary Examiner* — Rob Swiatek
*Assistant Examiner* — Ebony Evans
(74) *Attorney, Agent, or Firm* — John J. Welch, Jr., Esq.

(57) ABSTRACT

A fish feeding device featuring an elongated shaft component with a first end portion formed into the shape of a helix for holding foodstuffs below the level of water in a fish tank and with a stopper component held by the shaft, keeping the shaft away from the inner walling of any panel portion of the tank and with the shaft component being bent about a vertically inclined central axis of symmetry of the shaft component for purposes of holding the invention about upper edging of the given panel portion and featured by further bends of the shaft component serving to hold the device fast in place about the exterior walling of and accordingly the panel portion of the fish tank.

24 Claims, 10 Drawing Sheets

FISH FEEDING DEVICE

PRIOR OR PARENT APPLICATIONS

The invention is not the subject of any prior or parent applications for Letters Patent.

FEDERALLY SPONSORED RESEARCH AND DEVELOPMENT

The invention is not the subject of any federally sponsored research and development.

BACKGROUND OF THE INVENTION a. Field of the Invention

The invention relates to that coterie of devices serving to facilitate a feeding of food to fish within a fishtank.

b. Related Art

The herewith submitted Art Informational Statement references art related to, but that however does not anticipate the instant invention.

A SUMMARY OF THE INVENTION a. A Brief Description of the Invention

The invention consists, first and foremost of an elongated, malleably metallic shaft component. For a preferred embodiment, the shaft component is made of stainless steel and is cylindrically shaped throughout. The shaft component has an elongated, vertically inclined first central axis of symmetry, and; a transverse horizontally inclined second central axis of symmetry. A first end portion of the shaft component is bent into the form of a helix terminating at an open first end. This bending is found below the lie of the second axis. Above the lie of the second axis, the shaft is bent for a second bend away from the lie of the first axis and then further bent posteriorly, then down and through to a last portion of the shaft component that is bent anteriorly terminating at a second open end. A rubbery stopper component with a slit cut lengthwise into it, is fitted to and frictionally held by the shaft component above the location of the helically formed first end portion of the shaft component. An optional rubbery sleeving component is fitted to the last portion of the shaft component and the second open end is bent slightly to stop the sleeving component from slipping off the last portion of the shaft component.

b. Objects of the Invention

Virtually all currently in vogue fish feeding systems and/or units serving to provide food to fish in fish tanks, provide such food in such a manner that it becomes invariably necessary for an owner of the fish in a tank to frequently need to reach into the tank and below the water level in the tank in order to scoop out remnant scraps of foodstuff after feeding has occurred. Such necessary doings are however notably inconvenient, messy and undesirable to perform. Resort to the instant invention for fish feeding purposes serves to virtually eliminate the need for such frequent resort to such an undesirable cleansing protocol. The invention is held about the top edging of, e.g. the transparent front panel of a fish tank at the apical portion of the second bend of the shaft component with the helically formed first end portion thereof then located below the level of water in the fish tank. Foodstuffs such as pieces of zucchini vegetation or pieces of meaty material are simply screwed onto and held by the helical portion of the shaft component of the invention and are accordingly readily and easily accessed by the fish within the water in the tank such that post ingestion of the so held foodstuffs, virtually none of such foodstuffs will be found resting as scraps on the floor of the tank. The stopper component of the invention serves to keep the shaft component and, in turn, also the helically formed first end portion thereof, away from the inner walling of the tank. The further bent portions of the shaft component serve to hold the shaft component in place about the panel by way of closely approximating the exterior walling of the panel portion in the region of the last portion of the shaft component terminating at the second end thereof.

Also, whereas, the shaft component is made up of a malleable, metallic component, the bending necessary to make the invention optimally functional is readily accomplished.

Finally, for a preferred embodiment, the malleable metallic material composition of the elongated shaft component of the invention is typically made up of stainless steel throughout. Resort to stainless steel in such respects serves to virtually wholly obviate any propensity for rusting of the portion of the shaft component under water in the tank to occur.

In conclusion, in view of the foregoing features of the invention, it is, respectfully submitted, clear that the invention is indeed new, useful and unique within the aegis of the art involving systems and/or units amenable to being resorted to for purpose of feeding fish within a fish tank.

A DESCRIPTION OF THE PREFERRED EMBODIMENTS

Figure 1:
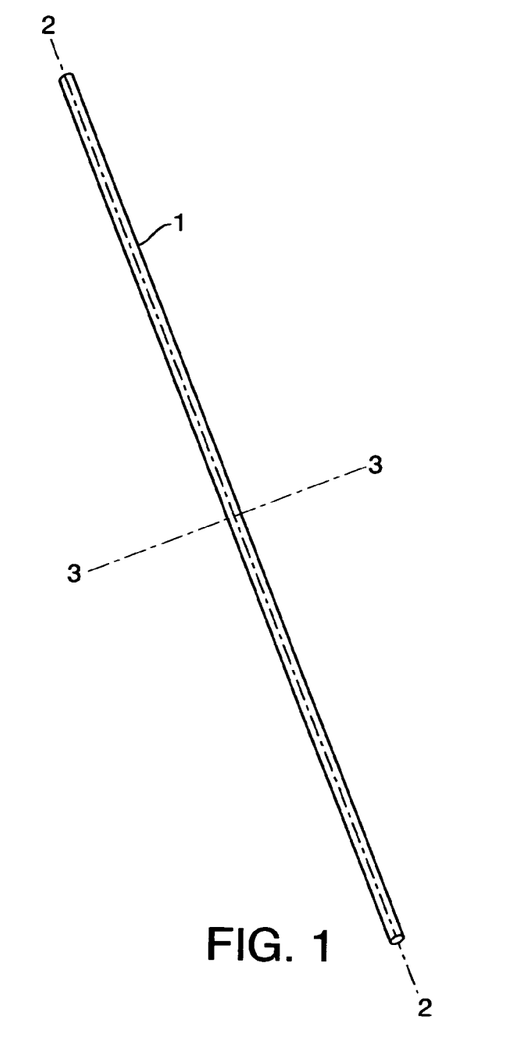
FIG. 1 is an isolated perspective view of the shaft component of the invention.
Figure 2A:
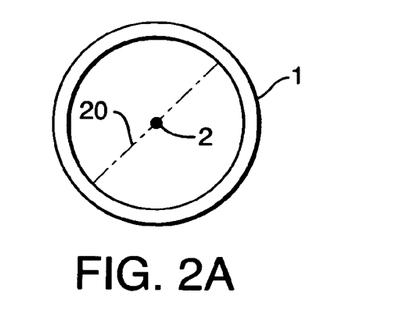
FIG. 2A is an end view of the preferred embodiment of the invention.
Figure 2B:
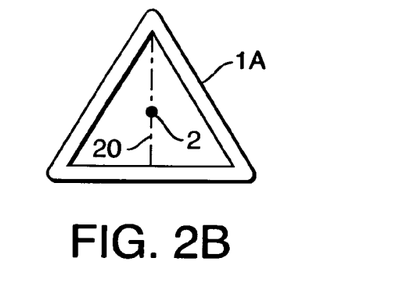
FIG. 2B is an end view of a second preferred embodiment of the invention.
Figure 2C:
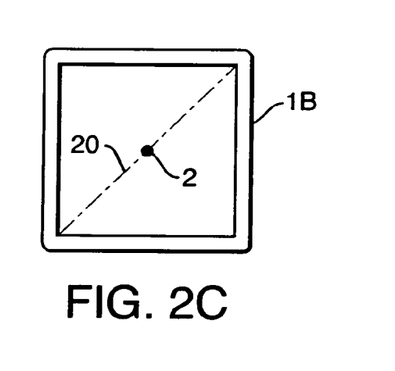
FIG. 2C is an end view of a third preferred embodiment of the invention.
Figure 3:
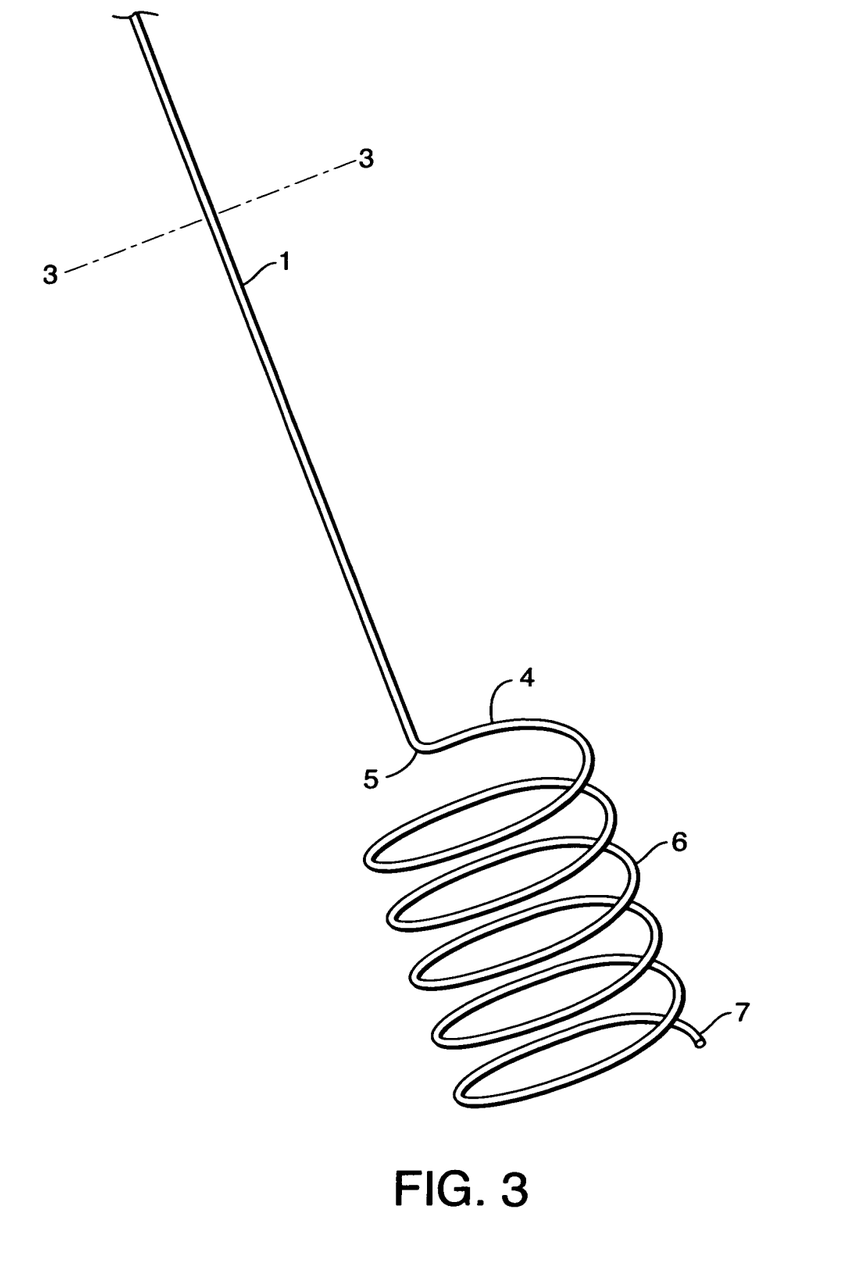
FIG. 3 is an isolated perspective view of the lower portion of the invention.
Figure 4:
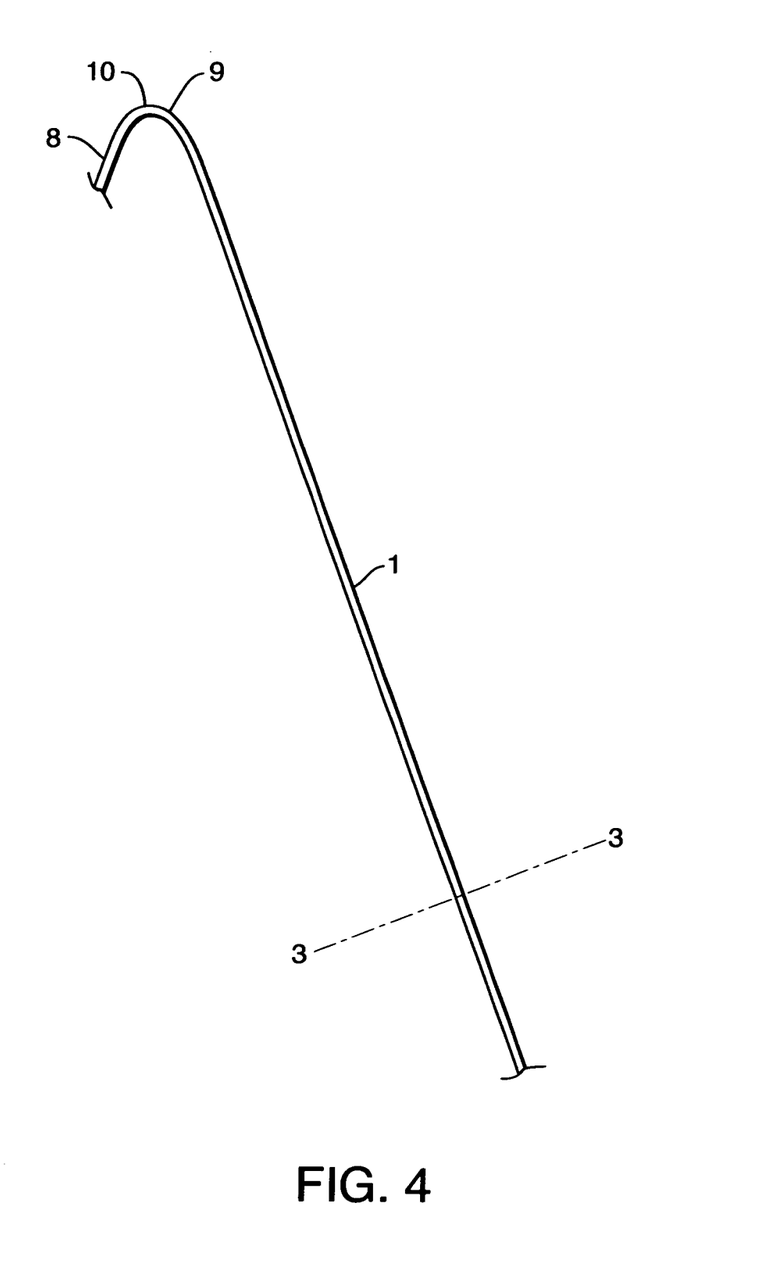
FIG. 4 is an isolated perspective view of part of the upper portion of the invention.
Figure 5:
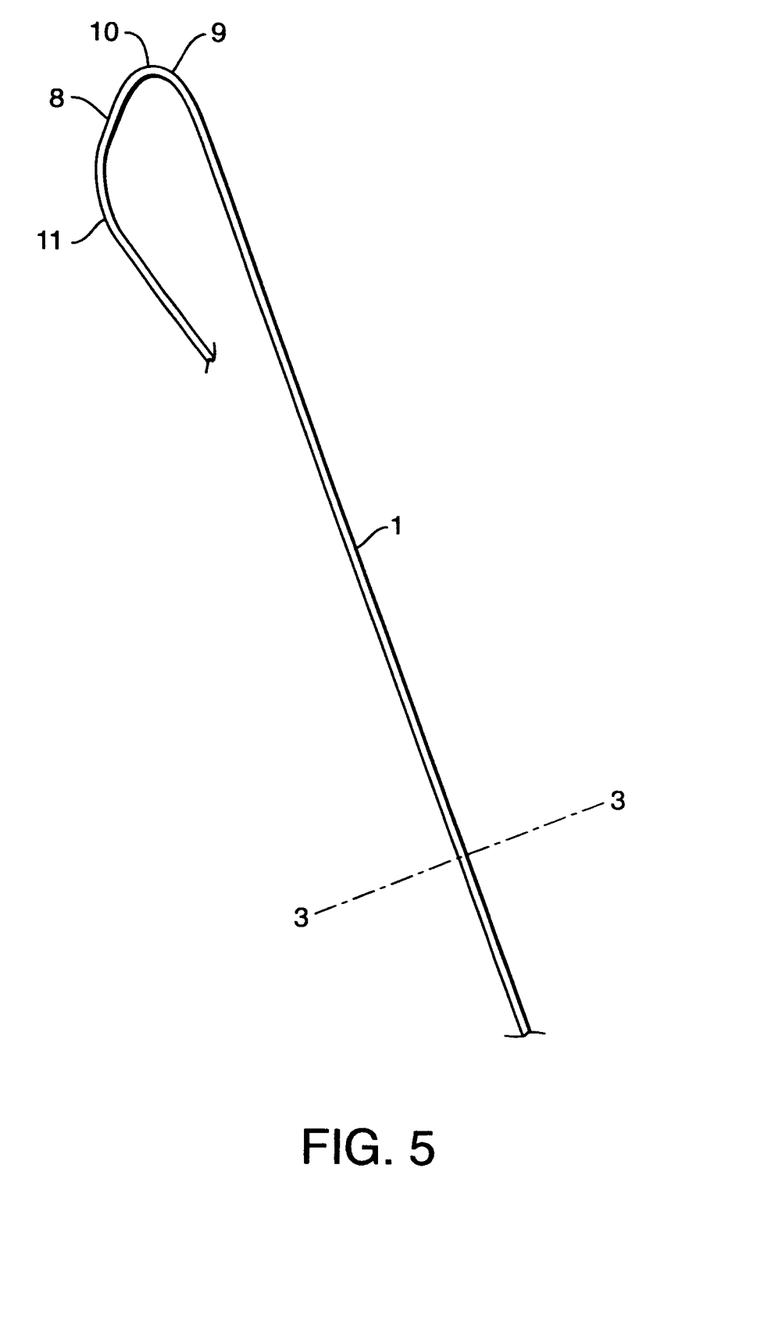
FIG. 5 is an isolated perspective view of further features of the upper portion of the invention.
Figure 6:
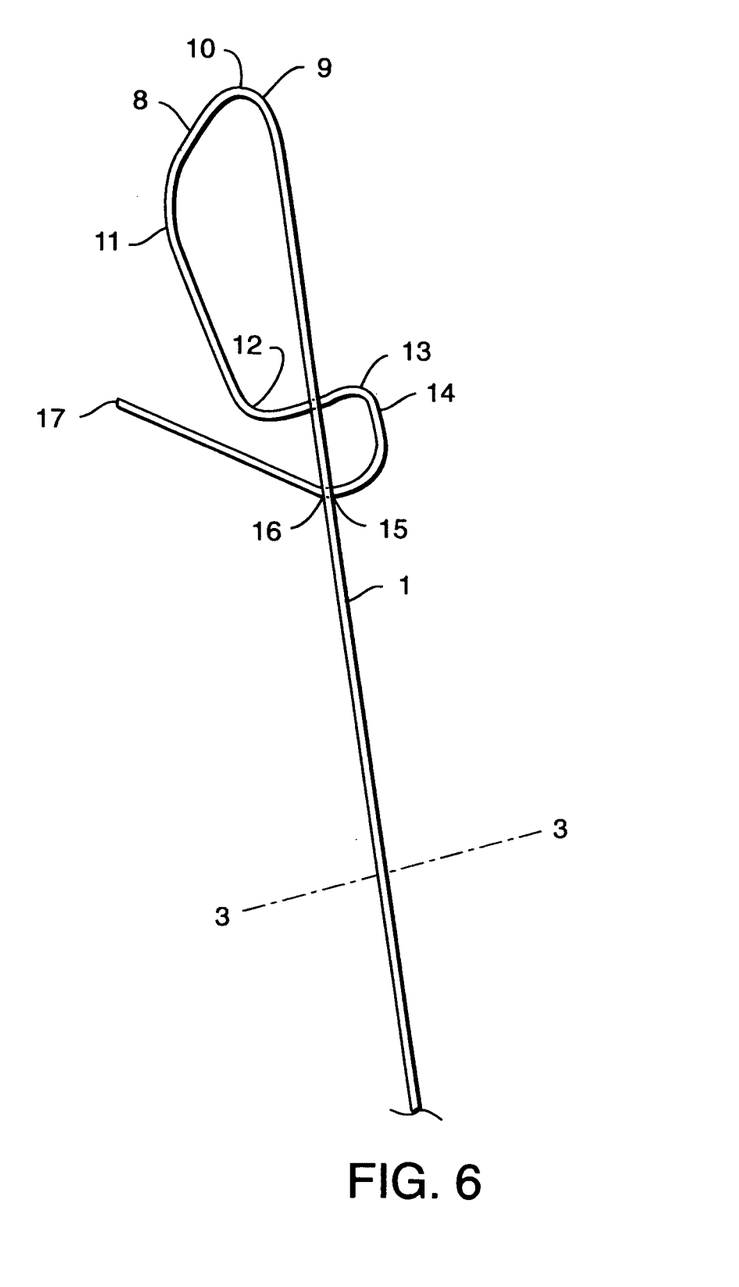
FIG. 6 is an isolated perspective view of yet more features of the upper portion of the invention.

The invention consists, first and foremost, of an elongated, malleably metallic shaft component 1 as is shown in FIG. 1. Shaft component 1 is ideally made of stainless steel which is essentially rust proof as well as being malleable such as would be other metallic materials such as, for example, bronze. The rust proof character of stainless steel is a very important feature of the invention, given that it is, in large part, submerged for not an insubstantial amount of time beneath the level of water E within a fish tank A as can be noted with reference to FIG. 15. Also seen in FIG. 1 are the elongated vertically inclined first central axis of symmetry 2 of the invention as well as the transverse horizontally inclined axis of symmetry 3 thereof, the lie of which is perpendicularly inclined to the lie of axis 2. Shaft component 1 is for the preferred embodiment, cylindrically shaped throughout as shown in FIG. 1 and FIG. 2A. It could however, also be triangularly shaped throughout as shown with reference to, in FIG. 2B or rectangularly shaped throughout as shown with reference to FIG. 2C. Shaft component 1 has a greatest horizontal breadth 20 as shown in FIG. 2A for shaft component 1 and in FIG. 2B for shaft component 1B. FIG. 3 shows shaft component 1 being bent for a first bend 4 in a first direction relative to, and away from the lie of axis 2 for a short distance relative to the lie of axis 2, through nearly a right angle with first bend 4 commencing at first locus point 5 on shaft 1 below the lie of axis 3. Shaft component 1 at the end of first bend 4 is then further bent into the form of a helix, being the helical first end portion 6 of shaft component 1 with portion 6 terminating a first open end 7 of shaft component 1. FIG. 4 illustrates how shaft component 1 is then bent for a second bend 8 in a second direction oppositely inclined to the above referenced first direction and also away from the lie of axis 2, with second bend 8 originating at second locus point 9 located above the lie of axis 3. Also seen in FIG. 4 is apical portion 10 of second bend 8. FIG. 5 illustrates shaft component 1 as being bent for third bend 11 slightly towards the vicinity of the lie of axis 2 as located in the vicinity of the lie of axis 3. FIG. 6 shows shaft component 1 then being bent, for a fourth bend 12, posteriorly relative to the position and vicinity of locus point 9. Shaft component 1 is then bent for a fifth bend 14 at the end 13 of fourth bend 12 which bend 14 is downwardly with reference to the locus of apical portion 10. The last end portion of shaft component 1 is that portion thereof characterized as a sixth bend 16 commencing at end 15 of fifth bend 14. Sixth bend 16 is oppositely directed with reference to the direction of fourth bend 12. Second open end 17 of shaft component 1, bent in the manner as described above is also seen in FIG. 6. All of the foregoing recitations in respect of shaft component 1 are equally applicable as respects shaft components 1A and 1B as well.

Figure 7:
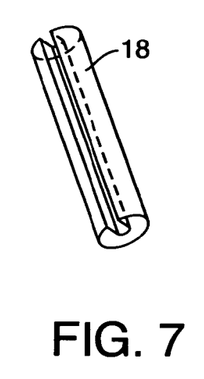
FIG. 7 is an isolated perspective view of the stopper component of the invention.
Figure 7A:
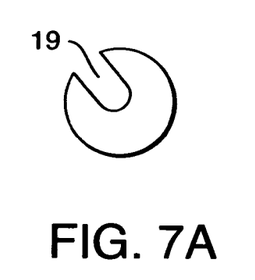
FIG. 7A is a top plan view of the stopper component of the invention.
Figure 8A:
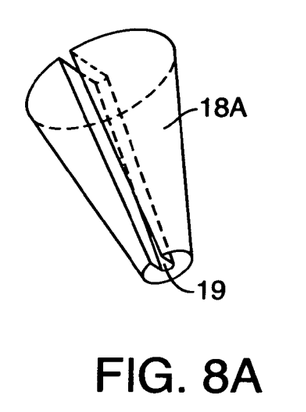
FIG. 8A depicts a second variant of the stopper component of the invention.
Figure 8B:
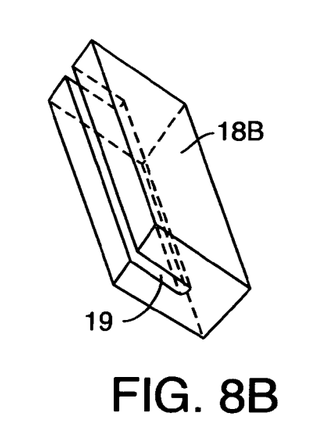
FIG. 8B depicts a third variant of the stopper component of the invention.
Figure 8C:
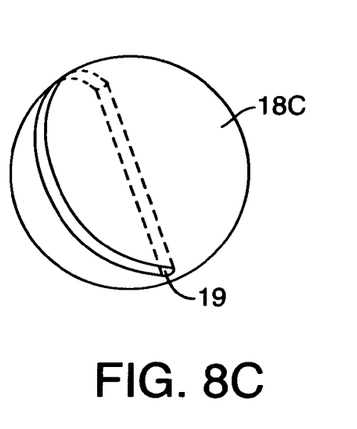
FIG. 8C depicts a fourth variant of the stopper component of the invention.
Figure 9:
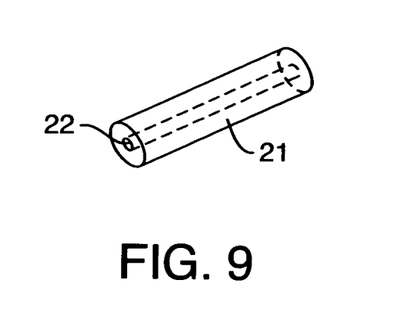
FIG. 9 is an isolated perspective view of the sleeving component of the invention.
Figure 10:
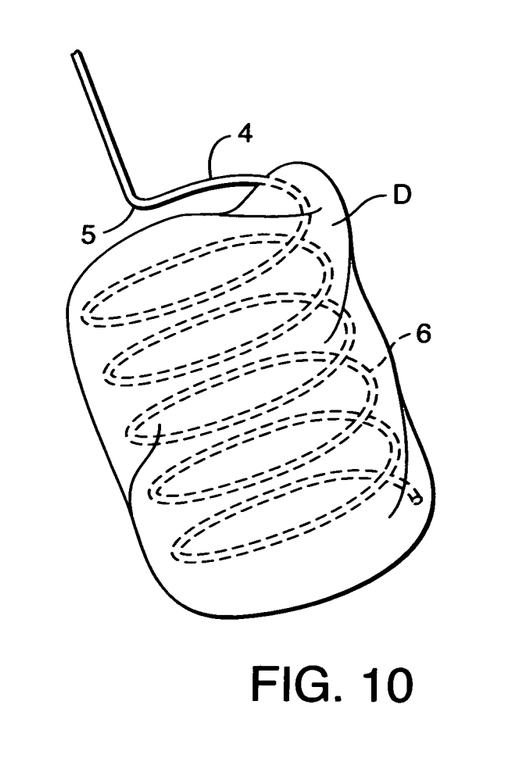
FIG. 10 is an isolated perspective view of foodstuff held by the helically shaped first end portion of the invention.
Figure 11:
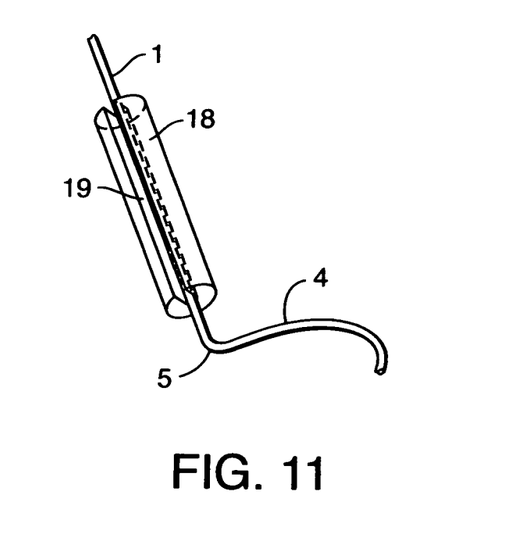
FIG. 11 is an isolated perspective view of the stopper component of the invention as being affixed to the shaft component thereof.
Figure 12:
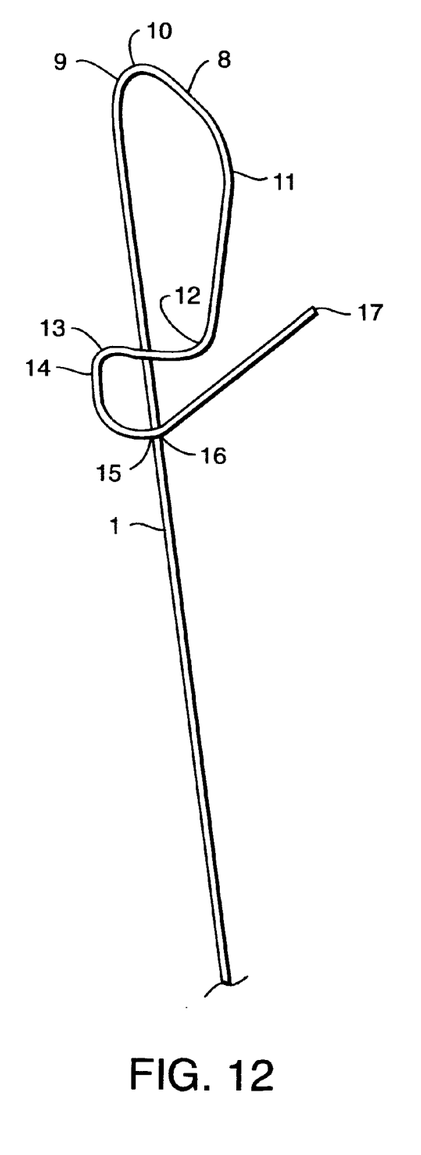
FIG. 12 is a rear plan view of the upper portion of the invention.

FIG. 7 is a depiction of rubbery, cylindrically shaped stopper component 18. A top to bottom slit 19 is cut into nearly half of stopper component 18 with the whole of slit 19 being narrower throughout than the greatest horizontal breadth 20 of shaft component 1 or 1A or 1B. FIG. 7A is a top plan view of stopper component 18 with slit 19 having been cut therein. FIGS. 8A, 8B and 8C depict stopper component variants 18A, 18B and 18C as being respectively hemiconically, parallelopipedly or spherically shaped. Stopper component 18 as seen in FIG. 11, by virtue of the relative narrowness of slit 19 therein is thus frictionally fitted to shaft component 1 or 1A or 1B above the location thereon of first locus point 5. The immediately foregoing recitation also applies as respects frictionally fitting of variants 18A, 18B or 18C to shaft component 1 or 1A or 1B. Rubbery or rubberlike sleeving component 21 within which there is a through hole 22 is shown in FIG. 9 as well as in FIGS. 13, 14 and 15. FIG. 12 depicts the upper portion of the invention without sleeving component 21. As will be noted with reference to FIG. 13, when the invention is equipped with sleeving component 21, then second open end 17 thereof is bent through a seventh bend 23. FIG. 10 shows, in isolated view, fish foodstuff D, e.g. zucchini vegetable food being held about helical first end portion 6 of the invention.

Figure 14:
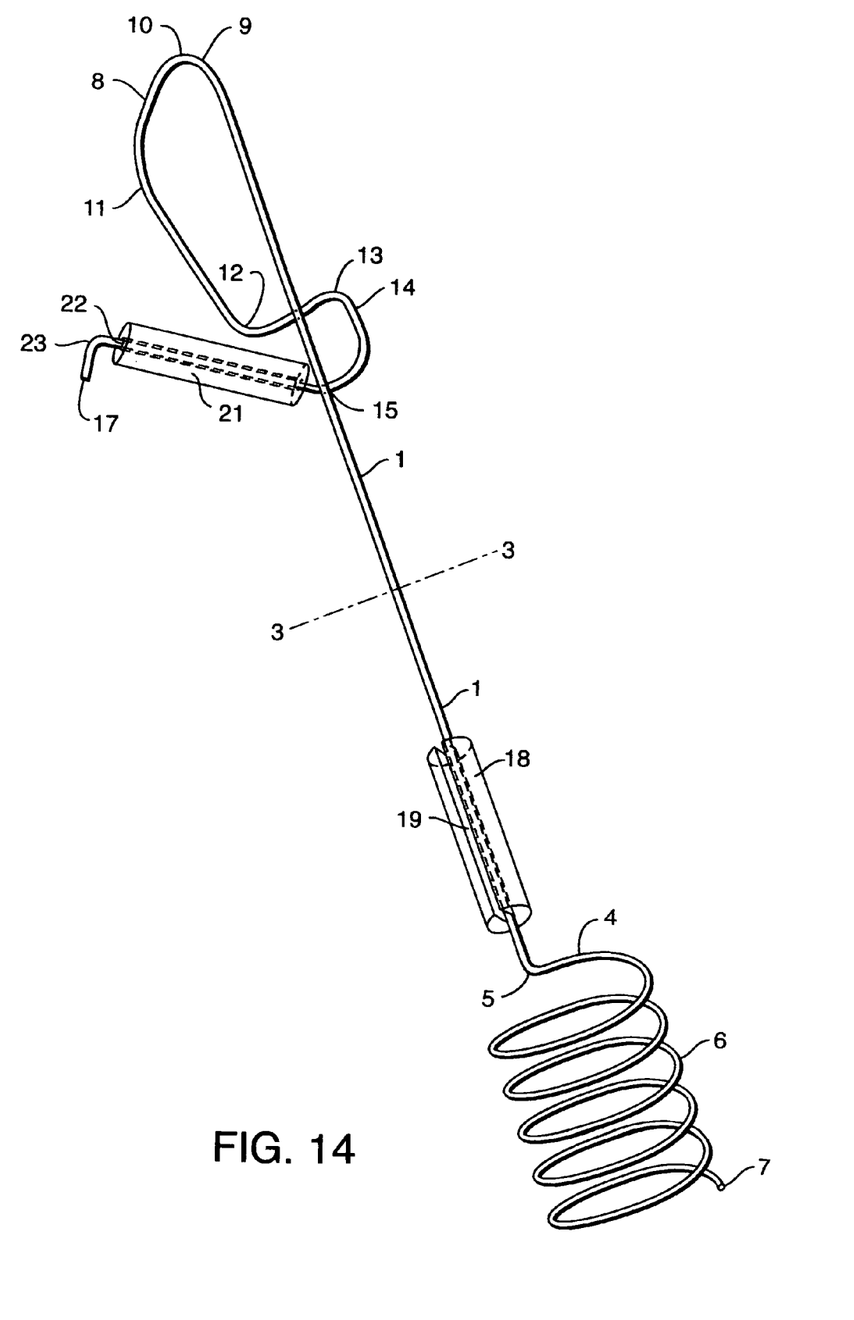
FIG. 14 is a perspective view of the whole of the preferred embodiment of the invention.
Figure 15:
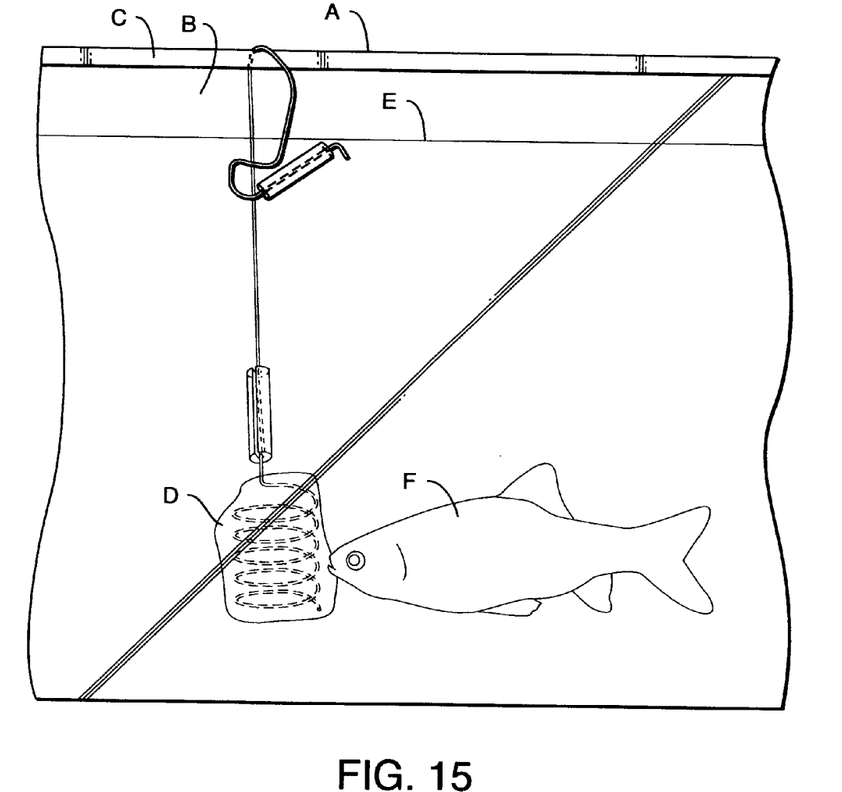
FIG. 15 depicts a section of a transparent panel portion of a fish tank holding a fish swimming in water and approaching foodstuff being held by the invention affixed the upper edging of the panel portion.

FIG. 15 depicts the whole invention as; once again, also seen in FIG. 14; being held about the upper edging C of the transparent panel portion B of a fish tank A containing a fish F swimming in water E and approaching foodstuff D held below the level of water E and about helical first end portion 6 of the invention.

Figure 13:
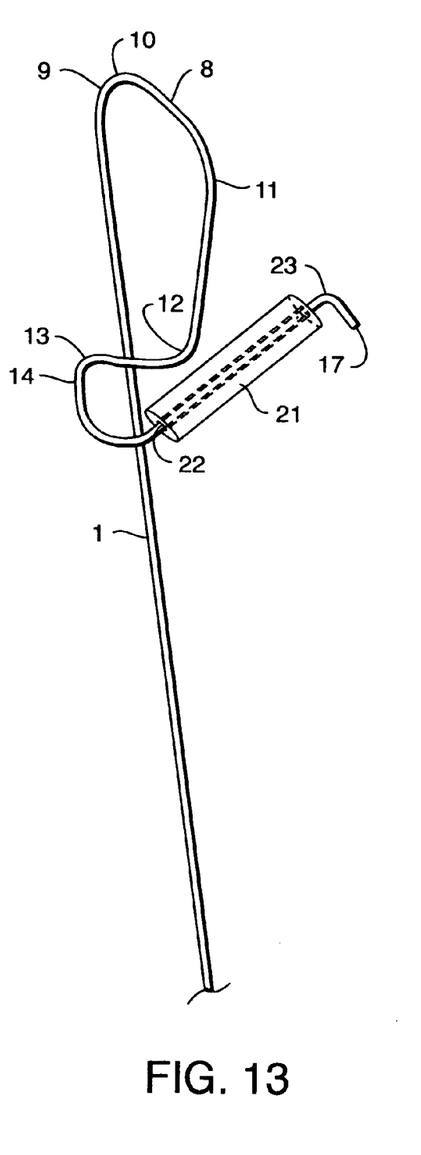
FIG. 13 is a rear plan view of the upper portion of the invention to which the sleeving component thereof has been affixed.

The stopper component 18 or 18A, 18B or 18C made of rubber or synthetic rubber serves to create space as between helical first end portion 6 holding foodstuff D and the inner walling of panel portion B of fish tank A. The second direction of second bend 8 is oppositely inclined to the first direction of first bend 4 specifically so as to most readily ensure that, when the invention is held about fish tank A as seen in FIG. 15, the foodstuff D so held about helical first end portion 6 will always be found maximally away from the inner walling of panel portion B. As will be noted with reference to FIG. 15, the invention is held about upper edging C of panel B at the location of apical portion 10 of the invention. The various bends; second bend 8, third bend 11, fourth bend 12, fifth bend 14 and sixth bend 16 serve to ensure that the invention is held securely and dependably, relatively fast about panel portion B while foodstuff D is being ingested by a fish F swimming about in water E within fish tank A. Sleeving component 21 being also made of rubber or synthetic rubber material fits over sixth bend last end portion 16 by way of affixing component 21 over portion 16 via through hole 22. Bend 23 at open end 17 serves to prevent sleeving component 21 from slipping off sixth bend last end portion 16. Sleeving component 21 in addition to facilitating even more fast holding of the invention against the outer walling of panel portion B, also serves to prevent any possible scratching of the outer walling of panel portion B by the metallic shaft component 1. The invention as shown in FIG. 12 can function quite well without sleeving component 21, but, it functions optimally with having been fitted with sleeving component 21 as shown in FIG. 13.

In conclusion, the invention, the preferred embodiment of which is shown with particularity in FIG. 14, in view of the features thereof, as described above; is not only new, useful and unique, but is, respectfully submitted, indeed truly revolutionary in the art of devices intended to facilitate the feeding of fish found within a fish tank.

What is claimed is:

1. A fish feeding device comprising:
   a. a malleably metallic, elongated shaft component;
   b. an elongated, vertically inclined first central axis of symmetry of said shaft component;
   c. a transverse, horizontally inclined second central axis of symmetry of said shaft component being perpendicularly inclined relative to a lie of said first central axis;

d. said shaft component being bent for a first bend in a first direction relative to said lie of said central axis, and away from said lie of said central axis for a short distance through nearly a right angle, with said first bend commencing at a first locus point on said shaft component located below a lie of said second central axis;

e. said shaft component at an end of said first bend, then being further bent continuously into the form of a helix, being a first end portion of said shaft component terminating at a first open end of said shaft component;

f. said shaft component then being bent for a second bend commencing at a second locus point on said shaft located above said lie of said second central axis, and; being so bent laterally in a second direction, oppositely inclined with reference to an inclination of said first direction, and also away from said lie of said first central axis;

g. said second bend having an apical portion thereof;

h. said shaft component then being bent for a third bend towards a vicinity of said lie of said first central axis within a vicinity of said lie of said second central axis;

i. said shaft component then being bent for a fourth bend at an end of said third bend, posteriorly relative to a vicinity of said second locus point;

j. said shaft component then being bent for a fifth bend at an end of said fourth bend, downwardly relatively to a locus of said apical portion;

k. a last end portion of said shaft component then being bent for a sixth bend at an end of said fifth bend, anteriorly opposite a direction of said fourth bend, and terminating at a second open end of said shaft component;

l. a stopper component;

m. said stopper component having a top to bottom slit cut into nearly half of said stopper component with said slit being narrower throughout than a greatest horizontal breadth of said shaft component, and;

n. said shaft component being frictionally fitted to and held within said slit by said stopper component above a location of said first locus point.

2. The fish feeding device of claim 1, whereby said malleably metallic, elongated shaft component is made of stainless steel.

3. The fish feeding device of claim 1, whereby said malleably metallic, elongated shaft component is cylindrically formed throughout.

4. The fish feeding device of claim 1, whereby said malleably metallic, elongated shaft component is triangularly formed throughout.

5. The fish feeding device of claim 1, whereby said malleably metallic, elongated shaft component is rectangularly formed throughout.

6. The fish feeding device of claim 1, whereby said stopper component is made of rubber material.

7. The fish feeding device of claim 1, whereby said stopper component is made of a synthetic rubber material.

8. The fish feeding device of claim 1, whereby said stopper component is cylindrically shaped.

9. The fish feeding device of claim 1, whereby said stopper component is parallelopipedly shaped.

10. The fish feeding device of claim 1, whereby said stopper component is spherically shaped.

11. The fish feeding device of claim 1, whereby said stopper component is hemiconically shaped.

12. The fish feeding device, comprising:

a. a malleably metallic, elongated shaft component;

b. an elongated, vertically inclined first central axis of symmetry of said shaft component;

c. a transverse, horizontally inclined second central axis of symmetry of said shaft component being perpendicularly inclined relative to a lie of said first central axis;

d. said shaft component being bent for a first bend in a first direction relative to said lie of said central axis, and away from said lie of said central axis for a short distance through nearly a right angle, with said first bend commencing at a first locus point on said shaft component below a lie of said second central axis;

e. said shaft component at an end of said first bend, then being further bent continuously into the form of a helix, being a first end portion of said shaft component terminating at a first open end of said shaft component;

f. said shaft component then being bent for a second bend commencing at a second locus point on said shaft located above said lie of said second central axis, and; being so bent laterally in a second direction, oppositely inclined with reference to an inclination of said first direction, and also away from said lie of said first central axis;

g. said second bend having an apical portion thereof;

h. said shaft component then being bent for a third bend towards a vicinity of said lie of said first central axis within a vicinity of said lie of said second central axis;

i. said shaft component then being bent for a fourth bend at an end of said third bend, posteriorly relative to a vicinity of said second locus point;

j. said shaft component then being bent for a fifth bend at an end of said fourth bend, downwardly relatively to a locus of said apical portion;

k. a last end portion of said shaft component then being bent for a sixth bend at an end of said fifth bend, anteriorly opposite a direction of said fourth bend, and terminating at a second open end of said shaft component;

l. a stopper component;

m. said stopper component having a top to bottom slit cut into nearly half of said stopper component with said slit being narrower throughout than a greatest horizontal breadth of said shaft component, and;

n. said shaft component being frictionally fitted to and held within said slit by said stopper component above a location of said first locus point;

o. a sleeving component featuring a lengthwise through hole, and being shorter than a length of said last portion of said shaft component;

p. said sleeving component being received via said through hole by said last portion of said shaft component, and;

q. said last portion being bent for a seventh bend near to and terminating at said second open end portion of said shaft component.

13. The fish feeding device of claim 12, whereby said malleably metallic, elongated shaft component is made of stainless steel.

14. The fish feeding device of claim 12, whereby said malleably metallic, elongated shaft component is cylindrically formed throughout.

15. The fish feeding device of claim 12, whereby said malleably metallic, elongated shaft component is triangularly formed throughout.

16. The fish feeding device of claim 12, whereby said malleably metallic, elongated shaft component is rectangularly formed throughout.

17. The fish feeding device of claim 12, whereby said stopper component is made of rubber material.

18. The fish feeding device of claim 12, whereby said stopper component is made of a synthetic rubber material.

19. The fish feeding device of claim 12, whereby said sleeving component is made of rubber material.

20. The fish feeding device of claim 12, whereby said sleeving component is made of a synthetic rubber material.

21. The fish feeding device of claim 12, whereby said stopper component is cylindrically shaped.

22. The fish feeding device of claim 12, whereby said stopper component is parallelopipedly shaped.

23. The fish feeding device of claim 12, whereby said stopper component is spherically shaped.

24. The fish feeding device of claim 12, whereby said stopper component is hemiconically shaped.

* * * * *